United States Patent
Yukisada et al.

[15] 3,662,240
[45] May 9, 1972

[54] SMALL-SIZE DIRECT CURRENT MOTOR

[72] Inventors: Toshio Yukisada, Daito; Takao Noma, Hirakata; Masanori Mirisawa, Moriguchi; Osamu Hashimoto, Higashiosaka, all of Japan

[73] Assignee: Matsushita Electric Industrial Co., Ltd., Osaka, Japan

[22] Filed: May 21, 1970

[21] Appl. No.: 39,221

[30] Foreign Application Priority Data

May 28, 1969 Japan......................44/43032

[52] U.S. Cl.......................318/325, 310/75, 318/330, 310/68
[51] Int. Cl.....................................H02k 27/20
[58] Field of Search..............318/325, 330; 310/261, 264, 310/269, 233, 192, 40 MM, 68.5, 75

[56] References Cited

UNITED STATES PATENTS

| | | | |
|---|---|---|---|
| 1,367,781 | 2/1921 | Jonghans | 310/75 B |
| 3,531,669 | 9/1970 | Samuta | 318/325 X |
| 3,202,898 | 8/1965 | Genning et al. | 318/325 |
| 3,058,045 | 10/1962 | Feindt | 318/325 |
| 3,143,695 | 8/1964 | Hohne et al. | 318/325 X |
| 3,184,671 | 5/1965 | Riggs | 318/325 |

*Primary Examiner*—G. R. Simmons
*Attorney*—Stevens, Davis, Miller & Mosher

[57] ABSTRACT

Improvements in small size DC electric motors for use in portable record players, small-size tape recorders, car stereos, etc., and particularly the armature construction of the motor.

5 Claims, 26 Drawing Figures

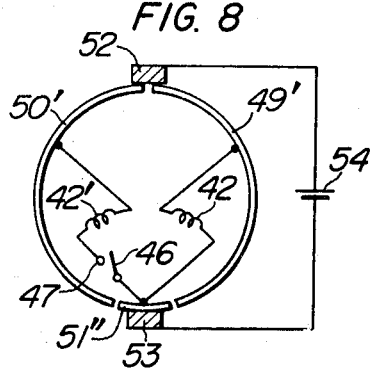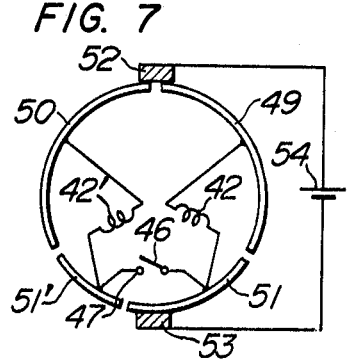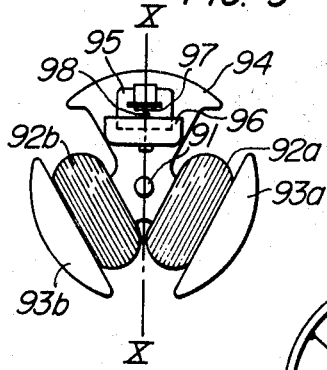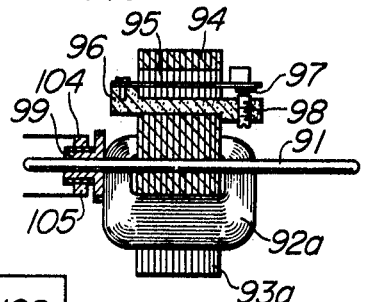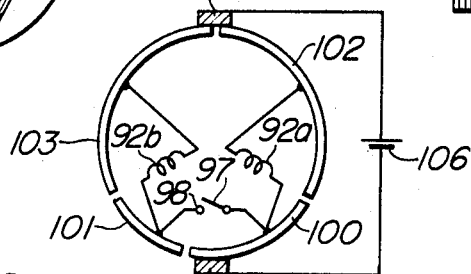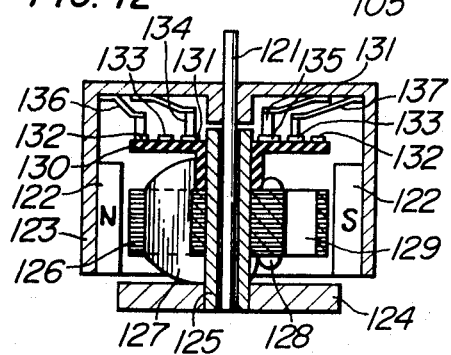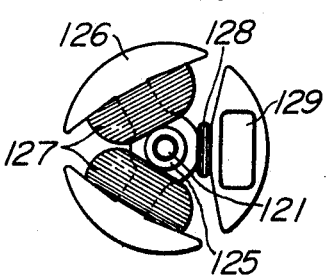

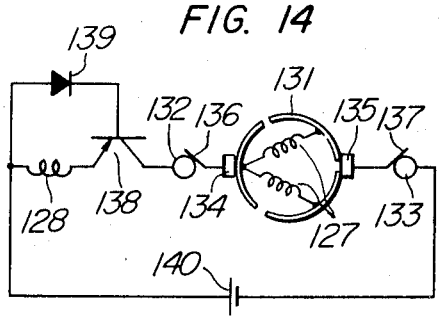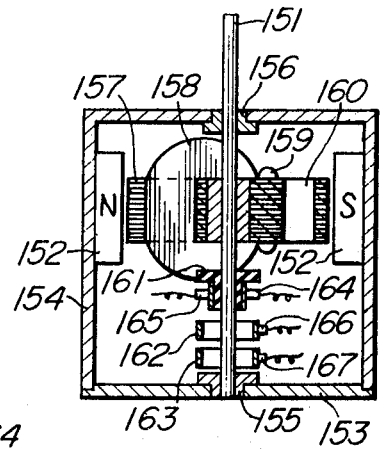

PATENTED MAY 9 1972

SMALL-SIZE DIRECT CURRENT MOTOR

This invention relates to improvements in small-size DC electric motors for use in portable record players, small-size tape recorders, car stereos, etc., and more particularly it relates to small-size DC electric motors having a speed governor such as a transistorized electronic speed governor or centrifugal speed governor for constant motor speed control.

A typical example of the conventional small-size DC electric motor having, for instance, a two-pole armature is of a construction as shown in FIG. 22 of the accompanying drawing. It comprises an armature rotor 221 disposed between the N and S poles of a stator and provided with armature coils, commutator segments 222 and brushes 223. With this construction, however, the motor cannot be self-started from the armature position as shown in the Figure. Also, as the number of the commutator segments is two, the voltage source is disadvantageously short-circuited through these commutator segments 222 and the two brushes 223.

The armature of a conventional small-size DC motor having a centrifugal speed governor has a construction as shown in FIG. 23. It comprises a rotary shaft 231, an armature core 232 secured to the shaft 231, armature coils 233, a centrifugal speed governor 234 secured to the shaft 231 and a commutator 235 also secured to the shaft 231. The armature coil is wound on all the poles of the armature core. With this construction, where the centrifugal speed governor 234 is secured to the rotary shaft at a position axially spaced from the armature core 232, the motor size tends to be large.

There is another type of conventional small-size DC motor, where the centrifugal speed governor is replaced by a transistorized electronic speed governor, as shown in FIGS. 24 to 26. It comprises an armature core 241 having all the poles wound with an armature coil 249 and secured to a boss 242, which is in turn secured to a rotary shaft 243 journaled in bearings 246 mounted in respective motor casing halves 244 and 245, commutator segments 248 secured to the rotary shaft 243, brushes 247, a DC voltage source 250, resistors 251, 252, 253, 254 and 258, transistors 255 and 256, a capacitor 257, a diode 259, and N and S pole pieces attached to the motor casing half 244. The resistors 251, 252 and 254 and armature coils 249 constitute a bridge circuit. Changes in the r.p.m. of the armature changes the motor speed detection voltage in the bridge circuit to vary the threshold voltage and trigger transistor 255 so as to change the threshold voltage to trigger transistor 256 connected between the bridge circuit and the DC voltage source 250, thereby maintaining the motor speed at a constant value. The diode 259 serves to compensate the temperature of transistor 255, and the capacitor 257 and resistor 258 serve to compensate the starting of the motor. With this motor construction, where the voltage induced across the armature coils owing to back electromotive forces is detected through the brushes 247, a change in the voltage drop across the brushes 247 and the commutator segments 248 would change the motor speed. Also, if an arc is produced between the rectifying commutator and the brushes, the motor speed control becomes unstable. Further, the preset motor speed changes with the arc of the commutator segments and brushes.

The invention is intended to improve the foregoing drawbacks and inherent defects in the conventional armature construction of the small-size DC electric motors.

An object of the invention is to provide a small-size DC electric motor having a reduced number of armature poles wound with the armature coil without significantly impairing the motor characteristics.

Another object of the invention is to provide a small-size DC electric motor, whose armature core has an auxiliary pole not provided with an armature coil, but provided with a speed governor.

A further object of the invention is to attain highly precise constant motor speed control by providing an armature core having an auxiliary pole, which is not wound with the armature coil but which is wound with a motor speed detection coil to induce a voltage thereacross corresponding to the motor speed so as to actuate semiconductor elements in an electronic speed governor.

A still further object of the invention is to provide a small-size DC electric motor simple in construction and ensuring increased effects of preventing an arc between the commutator and the brush, which is attained by winding a discharge current take-up coil having a few turns on an auxiliary armature pole without the armature winding.

To meet these ends, the invention generally features an armature construction comprising an armature core having main poles each provided with an armature coil and an auxiliary pole provided with no armature coil and a number of commutator segments equal to or greater than the number of all the poles, both main and auxiliary, of the armature core.

The invention will now be described in conjunction with preferred embodiments thereof with reference to the accompanying drawing, in which;

FIGS. 7 and 8 show circuit connections for further embodiments of the motor armature according to the invention;

FIG. 9 is a front view of a still further embodiment of the small-size DC motor armature according to the invention;

FIG. 10 is a section taken along line X—X of FIG. 9;

FIG. 11 shows circuit connections for the armature of FIG. 9;

FIG. 12 is a schematic axial section of a small-size DC electric motor embodying the invention;

FIG. 13 is a front view of the armature of the motor of FIG. 12;

FIG. 14 shows circuit connections for the armature of FIG. 13;

FIG. 15 is a schematic axial section of another embodiment of the small-size DC motor according to the invention;

FIG. 16 shows circuit connection for the armature of the motor of FIG. 15;

FIG. 17 is a graph comparing the torque produced by the motor according to the invention shown in FIG. 15 with that produced by the conventional motor shown in FIG. 24;

FIG. 18 is a front view of a further embodiment of the small-size DC motor armature according to the invention;

FIG. 19 is a side view of the armature of FIG. 18;

Figure 1:
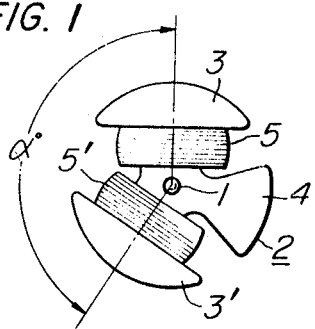
FIG. 1 is a front view of an armature of a small-size DC electric motor embodying the invention.
Figure 2:
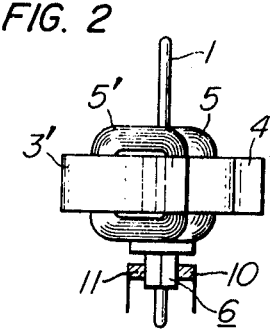
FIG. 2 is a side view of the armature of FIG. 1.
Figure 3:
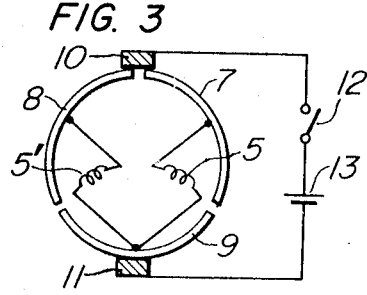
FIG. 3 shows circuit connections for the armature of FIG. 1.

Referring now to the drawings, FIGS. 1 to 3 illustrate an embodiment of the armature according to the invention comprising a rotary shaft 1 carrying an armature core 2 having main poles 3 and 3' and an auxiliary pole 4. The main poles 3 and 3' are provided with respective armature coils 5 and 5' wound thereon, while the auxiliary pole 4 is provided with no armature coil. Secured to the rotary shaft 1 is a commutator 6 consisting of three commutator segments 7 to 9. The armature coils 5 and 5' are connected at one end to the respective commutator segments 7 and 8. And armature coils 5 and 5' are connected at the other end to commutator segment 9. The commutator 6 contacts brushes 10 and 11 for connection across a DC voltage source 13 through a switch 12. In operation, by closing the switch 12 current is caused to pass through the armature coils 5 and 5' via the brushes 10 and 11 and the commutator segments 7 to 9, inducing voltages across the coils 5 and 5' to produce the motor torque.

As the above armature construction has three commutator segments against the two brushes 10 and 11, which are arranged at 180° from each other with respect to the center of the commutator, there is no possibility of short-circuiting the voltage source 13. Also, as the angle defined between the radial directions of the main poles 3 and 3', as indicated at $\alpha$, is smaller than 180°, starting of the motor is ensured. If the auxiliary pole 4 in the above construction is eliminated, variation of the motor torque with change in the position of the spinning armature core 2 would be great. Such variation is reduced to obtain smooth rotation of the armature by the provision of the auxiliary pole 4.

Figure 4:
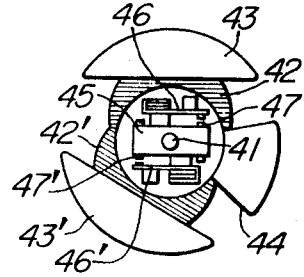
FIG. 4 is a front view of another embodiment of the small-size DC motor armature according to the invention.
Figure 5:
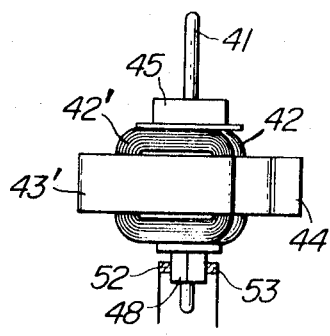
FIG. 5 is a side view of the armature of FIG. 4.
Figure 6:
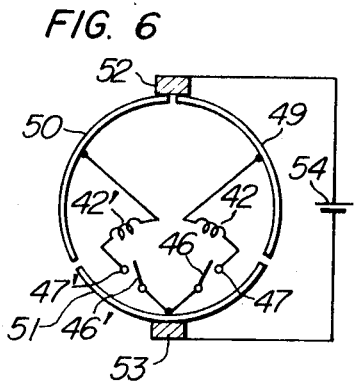
FIG. 6 shows circuit connections for the armature of FIG. 4.

FIGS. 4 to 6 illustrate an embodiment of the armature, which carries a centrifugal speed governor as an integral part thereof. It comprises a motor shaft 41 carrying an armature core secured thereto having main poles 43 and 43' wound with respective armature coils 42 and 42' and an auxiliary pole 44 without armature coil, a centrifugal speed governor 45 secured to the motor shaft 41 and having two contact pairs, namely a pair of a movable contact 46 and a fixed contact 47 and a pair of a movable contact 46' and a fixed contact 47', a commutator 48 also secured to the motor shaft 41 and consisting of three commutator segments 49 to 51, brushes 52 and 53 and a DC voltage source 54. The armature coils 42 and 42' are connected at one end to the respective fixed contacts 47 and 47' of the speed governor 45 and at the other end to the respective commutator segments 49 and 50. The movable contacts 46 and 46' are connected to the commutator segment 51. The commutator 48 contacts the brushes 52 and 53 for connection across the voltage source 54. In operation, when the speed of the armature is either zero or less than a predetermined value, the speed governor contacts 46 and 47 of both the pairs are in contact with the associated contacts 46' and 47', so that current can flow from the DC source 54 into the armature coils 42 and 42' via the brushes 52 and 53 and the commutator segments 49 and 51, inducing voltages across the armature coils 42 and 42' to produce the motor torque. The speed governor 45 revolves together with the spinning armature core, so that when the motor speed exceeds a predetermined value, centrifugal force breaks the contacts between the governor contacts 46 and 47 and between the governor contacts 46' and 47' to cut current off the armature coils 42 and 42', thereby reducing the motor speed. Thus, the motor speed is governed to a constant speed by the make-and-break action of the speed governor contacts 46 and 47 and 46' and 47'.

The two governor contact pairs of the preceding embodiment of FIGS. 4 to 6 may be replaced by a single pair of governor contacts to enable efficient motor speed control in the similar manner, as shown in FIGS. 7 and 8. In these single contact pair arrangements of FIGS. 7 and 8, the state of circuit connection for the armature is different from that shown in FIG. 6.

In the arrangement of FIG. 7, four commutator segments 49, 50, 51 and 51' are provided such that the segments 51 and 51' will not be brought into simultaneous contact with the brushes 52 and 53. The armature coils 42 and 42' are connected at one end to the respective commutator segments 49 and 50 and at the other end to the respective commutator segments 51 and 51', which are connected to each other through governor contacts 46 and 47.

In the arrangement of FIG. 8, three commutator segments 49', and 50' and 51" are provided. The segments 49' and 50' are of the same dimentions and larger than the segment 51". The armature coil 42 is connected between the segments 49' and 51", and the armature coil 42' is inserted in series with governor contacts 46 and 47 between the segments 50' and 51".

As is shown, with only a single pair of governor contacts it is possible to attain as stable motor speed control as with the two pairs of governor contacts as shown in FIG. 6. It will thus be seen that the highly stable motor speed control may be attained with an extremely simple armature construction having main poles each provided with an armature coil wound thereon and an auxiliary pole without armature coil, a number of commutator segments equal to or greater than the number of the total poles, both main and auxiliary, of the armature core and one or more governor switches revolving with the armature core.

FIGS. 9 to 11 illustrate another embodiment of the armature, where the centrifugal speed governor is mounted in the armature core. It comprises a motor shaft 91 carrying an armature core having main poles 93a and 93b provided with respective armature coils 92a and 92b and an auxiliary pole 94 without armature coil. The auxiliary pole 94 is formed with a hole 95, in which is mounted an insulating base member 96 supporting a centrifugal speed governor having a movable contact 97 and a fixed contact 98. To the motor shaft 91 is secured a commutator 99 consisting of four commutator segments 100 to 103 and in contact with brushes 104 and 105 for connection across a DC voltage source 106. The commutator segments 100 to 103 are divided into two groups, namely a group consisting of the segments 100 and 102 and a group consisting of the segments 101 and 103. Each of the segment groups consists of one of the larger segments 102 and 103 and one of the remaining smaller segments 100 and 101, so that the segments 100 and 101 will not be brought into simultaneous contact with the brushes 104 and 105. The armature coil 92a is connected between the commutator segments 102 and 100, while the armature coil 92b is connected between the commutator segments 103 and 101. The governor contacts 97 and 98 are connected to the respective commutator segments 100 and 101. In operation, when the speed of the armature is zero or less than a predetermined value, the governor contacts are closed, so that current from the DC source 106 passes through the armature coils 92a and 92b via the brushes 104 and 105 and the commutator segments 100 to 103, inducing voltages across the coils 92a and 92b to increase the r.p.m. of the armature. The speed governor revolves with rotating armature core, so that when the motor speed exceeds a certain predetermined value, the governor contacts 97 and 98 are opened to cut current off the armature coils 92a and 92b, thus reducing the motor speed. Thus, the motor speed may be maintained at a predetermined value with high precision by the make-and-break action of the single governor contact pair, and the reverse rotation of the armature may be obtained by altering the polarity of the DC voltage source 106. As the speed governer is installed in the auxiliary armature pole without armature coil, the axial dimension of the armature is reduced to reduce the motor size.

FIGS. 12 to 14 illustrate an embodiment of the small-size DC electric motor, where the centrifugal speed governor is replaced with a transistorized electronic speed governor. It comprises a motor shaft 121 carrying a rotor 123 secured thereto and provided with magnet pieces 122 and a stator base 124 provided with a boss 125, in which the motor shaft 121 is rotatably inserted, and to which is secured a three-pole armature core 126 having two poles respectively wound with an armature coil 127 and the remaining pole provided with a motor speed detection coil 128 and formed with a hole 129. To the boss 125 is secured a support member 130 carrying a commutator 131 and slip rings 132 and 133. To the rotor 123 are provided commutator brushes 134 and 135 in contact with the commutator 131 and power supply brushes 136 and 137 in contact with the respective slip rings. The two armature coils 127 are connected in V-shaped fashion to the segments of the commutator 131. The motor speed detection coil 128 is connected between one terminal of a DC voltage source 140 and the emitter of a transistor 138, whose collector is connected to the slip ring 132. A diode 139 is connected between the aforementioned terminal of the DC source 140 and the base of the transistor 138. The transistor 138 and the diode 139 are accommodated within the aforementioned hole 129. If the single transistor is insufficient for the motor speed control, two or more transistors may be incorporated. Also, if resistors and capacitors are to be incorporated, they may be integrated into a miniature IC tip for installation in the hole 129. The diode 139 serves both to obtain a reference voltage and to compensate for a change in temperature of the transistor 138. In operation, as the motor speed increases the amplitude of and frequency for the voltage induced across the motor speed detection coil is increased, and when a predetermined motor speed is reached, the transistor 138 is cut off to hold the motor speed constant.

FIGS. 15 and 16 illustrate another embodiment of the small-size DC electric motor according to the invention. It comprises a motor shaft 151 carrying an armature core 157 secured thereto and journaled in bearings 155 and 156 mounted in respective motor casing halves 153 and 154. The armature core 157 is the same in construction as the armature core 126 of FIG. 13, having main poles provided with respective armature coils 158 and an auxiliary pole provided with a motor speed detection coil 159 and formed with a hole 160. Secured to the motor shaft 151 are a commutator 161 in contact with brushes 164 and 165 and slip rings 162 and 163 in contact with respective power supply brushes 166 and 167. The motor speed detection coil 159 is connected at one end through the slip ring 162 and the power supply brush 166 to one terminal of a DC voltage source 168 and at the other end to the emitter of a transistor 169, whose collector is connected through the slip ring 163 and the power supply brush 167 to the brush 165. The other terminal of the DC source 168 is connected to the brush 164. The two armature coils 158 are connected in V-shaped fashion to the segments of the commutator 161. A diode 170 is connected between the base of the transistor 169 and the slip ring 162 to obtain a reference voltage. The operation of the circuit of FIG. 16 just described is the same as the previous circuit of FIG. 14.

Figure 24:
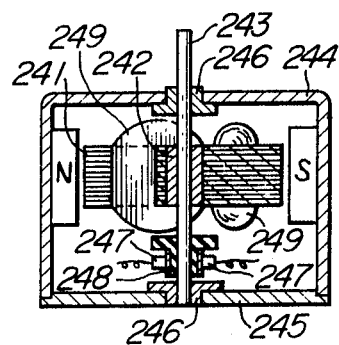
FIG. 24 is a schematic axial section of an example of the convention small-size DC electric motor.
Figure 25:
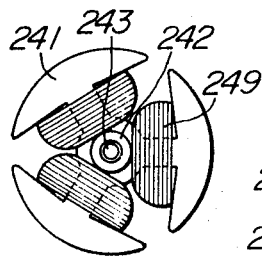
FIG. 25 is a front view of the armature of the motor of FIG. 24.
Figure 26:
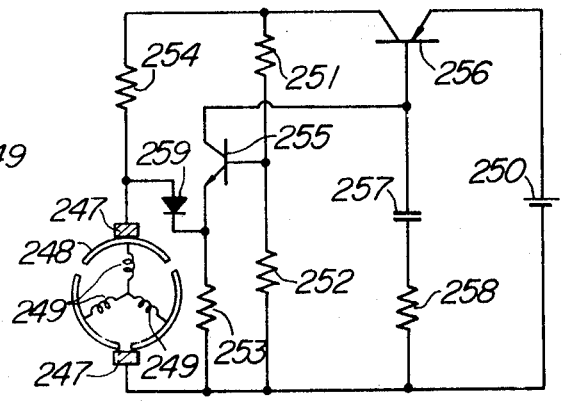
FIG. 26 shows circuit connections for the armature of FIG. 25.

The torque characteristic of the motor of the above type with respect to the position of the rotating armature is shown in FIG. 17, where the dashed curve indicates the torque characteristic for the motor of FIG. 15 according to the invention and the solid curve indicates the torque characteristic for the conventional motor of FIG. 24. As is apparent from this Figure, with the motor having an armature core provided with an auxiliary pole without an armature coil according to the invention, as smooth a rotation of the armature as with the conventional motor may be ensured.

It will be seen from the foregoing that with the motors according to the invention shown in FIGS. 12 to 14 and in FIGS. 15 and 16 the motor speed detection voltage induced across the motor speed detection coil has direct influence upon the control transistor without the agency of the brushes and commutator segments, so that there is no need to construct a bridge circuit and stable speed control is attained regardless of the deterioration of the brushes and commutator segments. Also, since the motor speed detection coil, which is provided separately from the armature coils, can provide AC output proportional to the motor speed as the control signal, the speed control is realized at frequencies corresponding to the motor speed, thus even if the load changes greatly a constant precise motor speed is ensured. Further, since all the governor circuit elements such as transistors may be mounted in the auxiliary armature pole without the armature coil, it is possible to reduce the motor size, dispense with connection leads and suppress the generation of electric noise.

Figure 20:
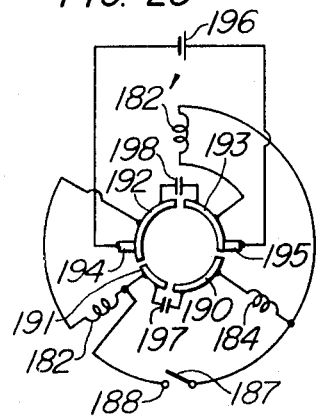
FIG. 20 shows circuit connections for the armature of FIG. 18.

FIGS. 18 to 20 illustrate a further embodiment of the motor armature according to the invention. It comprises a motor shaft 181 carrying an armature core secured thereto and having main poles 183 and 183' provided with respective armature coils 182 and 182' and an auxiliary pole 185 wound with a discharge current take-up coil 184 of very few turns.

Secured also to the motor shaft 181 are a centrifugal speed governor 186 having a movable contact 187 and a fixed contact 188 and a commutator 189 consisting of four segments 190 and 193. The dimensions of the commutator segments 190 and 191 are such that they will not be brought into simultaneous contact with brushes 194 and 195. Between the commutator segments 191 and 192 is connected the armature coil 182, and between the commutator segments 190 and 193 is connected a series circuit consisting of the armature coil 182' and the discharge current take-up coil 184. The goverñer contacts 187 and 188 are inserted in series with the discharge current take-up coil 184 between the commutator segments 190 and 191. Capacitors 197 and 198 are respectively connected between the commutator segments 190 and 191 and between the commutator segments 192 and 193.

In operation, when the speed of the armature is low, the governor contacts 187 and 188 are closed, so that current from the DC source 196 flows through the armature coils 182 and 182' via the brushes 194 and 195 and the commutator segments 190 and 193 to increase the armature speed. When the motor speed exceeds a predetermined value, the governor contacts 187 and 188 are opened to cut the armature current, thus decreasing the motor speed. Thus, highly precise motor speed control is attained by the make-and-break action of the pair of the governor contacts 187 and 188. The capacitors 197 and 198 serve to prevent arcing from occurring during the motor operation between the brushes 194 and 195 and the commutator segments 190 to 193. The capacitor 198 is discharged through the armature coils 182 and 182' and the governor contacts 187 and 188, but the governor contacts 187 and 188 suffer no detrimental effects because of the inductance of the armature coils 182 and 182'. The capacitor 197, on the other hand, is discharged through the discharge current take-up coil 184 and the governor contacts 187 and 188. If the governor contacts 187 and 188 are directly connected across the capacitor 197 without the discharge current take-up coil 184, they suffer from the discharge current from the capacitor 197 to degrade the stability of the armature rotation.

Figure 21:
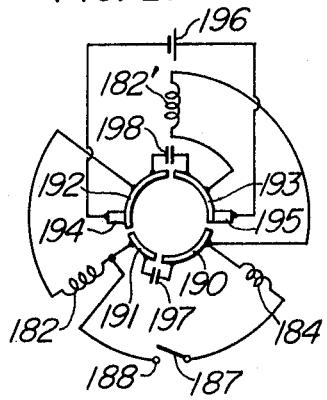
FIG. 21 shows circuit connections for a modification of the armature of FIG. 18.
Figure 23:
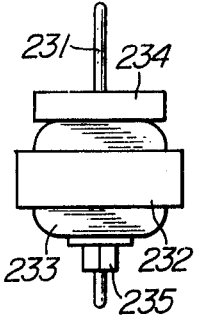
FIG. 23 is a side view of another example of the conventional armature.
Figure 22:
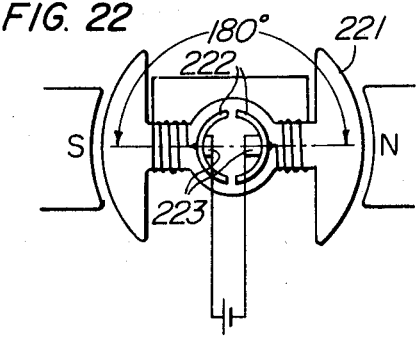
FIG. 22 is a schematic front view showing an example of the conventional armature as well as circuit connections therefor.

The arrangement shown in FIG. 21 is similar to the circuit of FIG. 20 except for the connection of the discharge current take-up coil 184. In this arrangement, a series circuit consisting of the governor contacts 187 and 188 and the discharge current take-up coil 184 is inserted between the commutator segments 190 and 191, and the armature coil 182' is connected between the commutator segments 190 and 193. Thus, as both the capacitors 197 and 198 are discharged through the discharge current take-up coil 184, the discharge does not exhibit any undesired effects on the governor contacts 187 and 188, so extending the service life of the commutator.

What is claimed is:

1. A small-size DC motor comprising an armature including an armature core having main poles each with an armature coil and an auxiliary pole with no armature coil, said auxiliary pole being formed with a window hole extending therethrough in an axial direction of said motor, a commutator including a number of segments, the number of which is at least equal to the number of said main and auxiliary poles, and a governor switch mounted in said window hole and including movable and fixed governor contacts, said movable contact being provided on a member longitudinally extending through said window hole for movement in a plane including the axial direction of said motor.

2. A small-size DC motor according to claim 1, wherein said armature core comprises two main poles each with an armature coil and one auxiliary pole with no armature coil and said commutator comprises two groups of segments, each group consisting of two adjacent segments between which the armature coil of a corresponding one of said two main poles is connected, and said governor switch being connected between two adjacent segments respectively selected from said two groups.

3. A small-size DC motor according to claim 1, further comprising a speed detector coil mounted on said auxiliary pole.

4. A small-size DC electric motor comprising an armature including an armature core having main poles respectively provided with an armature coil and an auxiliary pole provided with no armature coil and formed with a window hole, a commutator consisting of a number of segments, said number being at least equal to the total number of said main and auxiliary poles of said armature core, a motor speed detection coil wound on said auxiliary pole, and a semiconductor element mounted in said window hole and adopted to have an internal resistance change in response to the motor speed detection voltage induced across said motor speed detection coil to control current through said armature coils.

5. A small-size DC electric motor comprising an armature including an armature core having main poles respectively provided with an armature coil and an auxiliary pole provided with no armature coil, a commutator consisting of a number of segments, said number being at least equal to the total number of said main and auxiliary poles of said armature core, a discharge current take-up coil wound on said auxiliary pole and having few turns, and a motor speed governor switch, wherein said commutator segments are divided into two groups respectively consisting of a plurality of commutator segments, said armature coils are respectively connected between two commutator segments in the respective groups, and said discharge current take-up coil is inserted in series with said governer switch between two commutator segments in the respective groups.

* * * * *

PO-1050
(5/69)

UNITED STATES PATENT OFFICE
CERTIFICATE OF CORRECTION

Patent No. 3,662,240　　　　　　　　Dated May 9, 1972

Inventor(s) Toshio YUKISADA et al

It is certified that error appears in the above-identified patent and that said Letters Patent are hereby corrected as shown below:

The third inventor's name should be spelled Masanori MORISAWA.

In the Claim for Convention Priority, four of the five Japanese applications claimed are missing and should be included as follows:

-- Japan, Patent Application No. 43033/69 filed May 28, 1969
　 Japan, Patent Application No. 43034/69 filed May 28, 1969
　 Japan, Patent Application No. 43035/69 filed May 28, 1969
　 Japan, Patent Application No. 90275/69 filed November 10, 1969

Signed and sealed this 23rd day of January 1973.

(SEAL)
Attest:

EDWARD M. FLETCHER, JR.　　　　　　ROBERT GOTTSCHALK
Attesting Officer　　　　　　　　　Commissioner of Patents